(12) United States Patent
Rainone et al.

(10) Patent No.: US 10,814,773 B1
(45) Date of Patent: Oct. 27, 2020

(54) AUTOMATED, WIRELESS, CARGO RESTRAINT TENSION CONTROL AND MONITORING SYSTEM

(71) Applicants: Michael D. Rainone, Palestine, TX (US); Samuel A. Sackett, Frankston, TX (US); Adam C. Vance, Palestine, TX (US); Scotty J. Bammel, Palestine, TX (US); Thomas E. Crippen, Tyler, TX (US); Brook Grisham, Palestine, TX (US)

(72) Inventors: Michael D. Rainone, Palestine, TX (US); Samuel A. Sackett, Frankston, TX (US); Adam C. Vance, Palestine, TX (US); Scotty J. Bammel, Palestine, TX (US); Thomas E. Crippen, Tyler, TX (US); Brook Grisham, Palestine, TX (US)

(*) Notice: Subject to any disclaimer, the term of this patent is extended or adjusted under 35 U.S.C. 154(b) by 390 days.

(21) Appl. No.: 15/787,679

(22) Filed: Oct. 18, 2017

Related U.S. Application Data

(60) Provisional application No. 62/409,530, filed on Oct. 18, 2016.

(51) Int. Cl.
    *B60P 7/08*     (2006.01)
    *G01L 5/04*     (2006.01)
    *G01L 5/10*     (2020.01)

(52) U.S. Cl.
    CPC ............. *B60P 7/0861* (2013.01); *B60P 7/083* (2013.01); *G01L 5/047* (2013.01); *G01L 5/10* (2013.01)

(58) Field of Classification Search
    CPC ... G01L 1/04; G01L 1/047; G01L 1/26; G01L 5/047; G01L 5/107; G01L 10/103;
(Continued)

(56) References Cited

U.S. PATENT DOCUMENTS 1,157,110 A    10/1915  Johnson
3,809,832 A *   5/1974  Burger .................. B65G 23/44
                                                          200/61.18
(Continued)

FOREIGN PATENT DOCUMENTS

WO       2007/100315       9/2007

OTHER PUBLICATIONS

International Search Report for PCT Application No. PCT/US2006/005079, dated Jul. 17, 2008.
(Continued)

*Primary Examiner* — Van T Trieu
(74) *Attorney, Agent, or Firm* — Kowert, Hood, Munyon, Rankin & Goetzel, P.C.; Mark R. DeLuca

(57) ABSTRACT

A cargo restraint system includes a body, a first connecting end and a second connecting end on opposing sides of the body, wherein the first and second connecting ends are coupled to a securing member which is used to restrain the cargo. One or more load sensors are coupled to the first connecting end and/or the second connecting end. A controller is coupled to the one or more load sensors. The controller is configured to receive tension information from the one or more load sensors. The controller includes a transmitter capable of transmitting the tension information to a remote device. The controller may include a database to store the information.

23 Claims, 11 Drawing Sheets

(58) Field of Classification Search
CPC . G05L 5/10; G01C 17/02; G01N 3/08; G08C 17/02; H02G 7/02; B66C 13/16; B66D 1/54; B60P 7/08; B60P 7/083; B60P 7/0838; B60P 7/0861; B60P 7/0884
See application file for complete search history.

(56) References Cited

U.S. PATENT DOCUMENTS

| | | | |
|---|---|---|---|
| 5,466,083 | A | 11/1995 | Hogg |
| 5,730,541 | A | 3/1998 | Duett et al. |
| 9,576,475 | B2* | 2/2017 | Bardin .................. H04Q 9/00 |
| 2010/0158629 | A1* | 6/2010 | Morland ............. B60P 7/0861 410/98 |
| 2014/0041926 | A1* | 2/2014 | McGuire ................ H02G 7/02 174/40 TD |
| 2016/0146683 | A1* | 5/2016 | Chau .................... B66C 13/16 73/862.391 |

OTHER PUBLICATIONS

Written Opinion for PCT Application No. PCT/US2006/005079, dated Jul. 17, 2008.
International Preliminary Report on Patentability for PCT Application No. PCT/US2006/005079, dated Mar. 10, 2009.

* cited by examiner

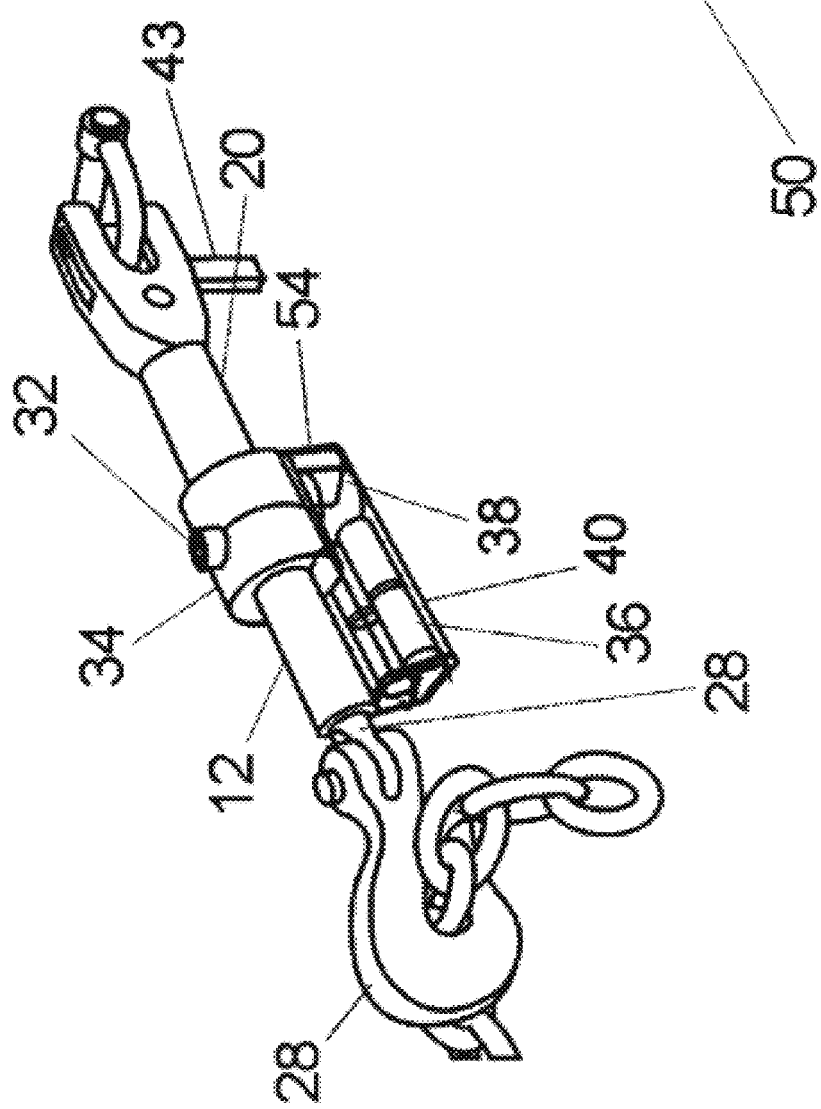
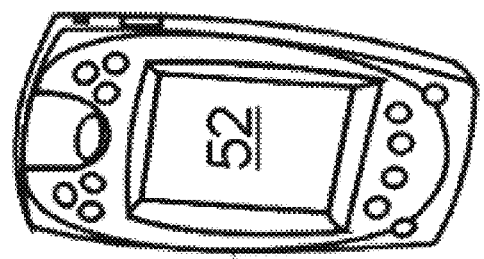
FIG. 8A
FIG. 8B

AUTOMATED, WIRELESS, CARGO RESTRAINT TENSION CONTROL AND MONITORING SYSTEM

PRIORITY CLAIM

This application claims priority to U.S. Provisional Application Ser. No. 62/409,530 entitled "AUTOMATED, WIRELESS, CARGO RESTRAINT SYSTEM" filed Oct. 18, 2016; which is incorporated herein by reference in its entirety.

BACKGROUND OF THE INVENTION

1 Field of the Invention

The invention generally relates to cargo restraint systems. More specifically, the invention relates to cargo restraint systems that include a smart controller that monitors the status of the cargo restraint system.

2. Description of the Relevant Art

The restraint of cargo is one of the critical technologies for the movement of all logistics. Shifting and loose cargo on any vehicle threatens the vehicle, those piloting the vehicle and those near the vehicle who may be impacted by the cargo if it is accidentally released. Almost daily there are news stories about drivers and passengers of vehicles that are injured, or even killed, by cargo that has been accidentally released from trucks and cars or becomes loose and moves within the transporting vehicle. In addition, in many locales, drivers of heavy carry trucks are required to constantly stop their vehicle and inspect the cargo restraints to insure that the load cannot get loose. Such stops are dangerous and time consuming. Passive tie down systems are incapable of alerting the drivers that the load has shifted, the restraint has come loose or even that the cargo has been lost. In addition, many pieces of cargo, such as large air conditioning units, require a limited holding force to insure that the cargo is not bent, distorted or ruined by overtightening, which increases the probability of a loosening event.

In addition, many of workers are reaching the end of their careers such that the effort to secure the cargo often results in strains and injury. The restraint devices such as chains and binders are heavy, require crawling around the vehicle, dragging such devices around the load, and lacing chains in and around the lashing points, activities which become more difficult as one ages. In addition, regardless of age, securing cargo is a time consuming activity and anything that reduces the time involved will produce significant cost savings.

Current methods of securing cargo utilize binders, straps and chains that give the user no knowledge of how much force is being used to hold down the cargo. In addition, the "dumb" security devices have no means of informing the user if and when a securing device has or will loosen to the point of losing the cargo.

SUMMARY OF THE INVENTION

The devices described in this disclosure are designed to reduce the risk of loose cargo by monitoring the tension on the load electronically and alerting the driver or other stakeholders regarding the level of tension placed on the cargo. The device further automatically adjusts the tension on the device (tightens or loosens), which should reduce over tensioning on sensitive loads, speed up the securing process and minimize the time spent checking the load. Finally, reducing the effort needed to secure the load reduces injuries and fatigue encountered in the process of securing the load.

In an embodiment, a cargo restraint system includes a body, a first connecting end and a second connecting end on opposing sides of the body, wherein the first and second connecting ends are coupled to a securing member which is used to restrain the cargo. One or more load sensors are coupled to the first connecting end and/or the second connecting end. A controller is coupled to the one or more load sensors. The controller is configured to receive tension information from the one or more load sensors. The controller includes a transmitter capable of transmitting the tension information to a remote device.

In an embodiment, the controller is further configured to filter out noise associated with the tension information, wherein the noise is associated with changes in tension produced by movement of the chain and/or the cargo. The filtered tension information is used by the controller to determine if the securing member is undergoing a loosening or tightening which requires adjustment of the tension applied by the securing member to the cargo. In one embodiment, the noise is defined as a percentage of a baseline tension. The controller is configured to send an alert to the remote device to indicate that the tension of the securing member on the cargo should be adjusted if the measured tension exceeds the noise.

In some embodiments, the controller is capable of transmitting tension information to the remote device using multiple communication modalities. In another embodiment, the controller is further configured with a transceiver, wherein the device is capable of receiving commands and settings from a remote device.

In some embodiments, the controller includes preset tension limits programmed into the controller. The controller provides an alert when the tension measured by the one or more load sensors is greater than or less than preset tension limit.

In an embodiment, the system includes a restraint system disposed in the body. The restraint system is configured to increase or decrease the tension on the securing member. In one embodiment, the restraint system is configured to increase or decrease the tension on the securing member in response to an alert produced by the controller when the tension on the securing member is above or below a predetermined tension. In one embodiment, the controller includes preset tension limits programmed into the controller. The restraint system is configured to increase or decrease the tension on the securing member in response to an alert produced by the controller when the tension on the securing member is above or below the preset tension limits.

In an embodiment, the controller provides an alert when the tension drops below a predetermined level that indicates that the cargo is no longer secured by the securing member.

In an embodiment, a method of restraining cargo includes passing a securing member around at least a portion of the cargo and coupling the ends of the securing member to a cargo restraint system. The cargo restraint system comprising the components as set forth in the Summary section above. The method further includes: increasing the tension on the securing member to secure the cargo in a predetermined location; monitoring the tension on the securing member using the one or more load sensors; and transmitting the tension information to a remote device.

In an embodiment, the method also includes filtering out noise associated with the tension information, wherein the noise is associated with changes in tension produced by movement of the chain and/or the cargo. The method also includes using the filtered tension information to determine if the securing member is undergoing a loosening or tightening which requires adjustment of the tension applied by the securing member to the cargo. In an embodiment, the noise is defined as a percentage of a baseline tension, and wherein the controller is configured to send an alert to the remote device to indicate that the tension of the securing member on the cargo should be adjusted if the measured tension exceeds the noise.

In an embodiment, the controller includes preset tension limits programmed into the controller. The method further includes providing an alert when the tension measured by the one or more load sensors is greater than or less than preset tension limit.

In an embodiment, the cargo restraint system further includes a restraint system disposed in the body. The method further includes increasing or decreasing the tension on the securing member using the restraint system. In one embodiment, the method includes increasing or decreasing the tension on the securing member in response to an alert produced by the controller when the tension on the securing member is above or below a predetermined tension. In some embodiments, the controller comprises preset tension limits programmed into the controller. The restraint system is configured to automatically increase or decrease the tension on the securing member in response to an alert produced by the controller when the tension on the securing member is above or below the preset tension limits.

In an embodiment, the method further includes providing an alert when the tension drops below a predetermined level that indicates that the cargo is no longer secured by the securing member.

BRIEF DESCRIPTION OF THE DRAWINGS

Advantages of the present invention will become apparent to those skilled in the art with the benefit of the following detailed description of embodiments and upon reference to the accompanying drawings in which:

FIG. 8A is a perspective view of an embodiment of a cargo restraint system;

FIG. 8B is a perspective view of a remote controller for a cargo resistant system;

Figure 1:
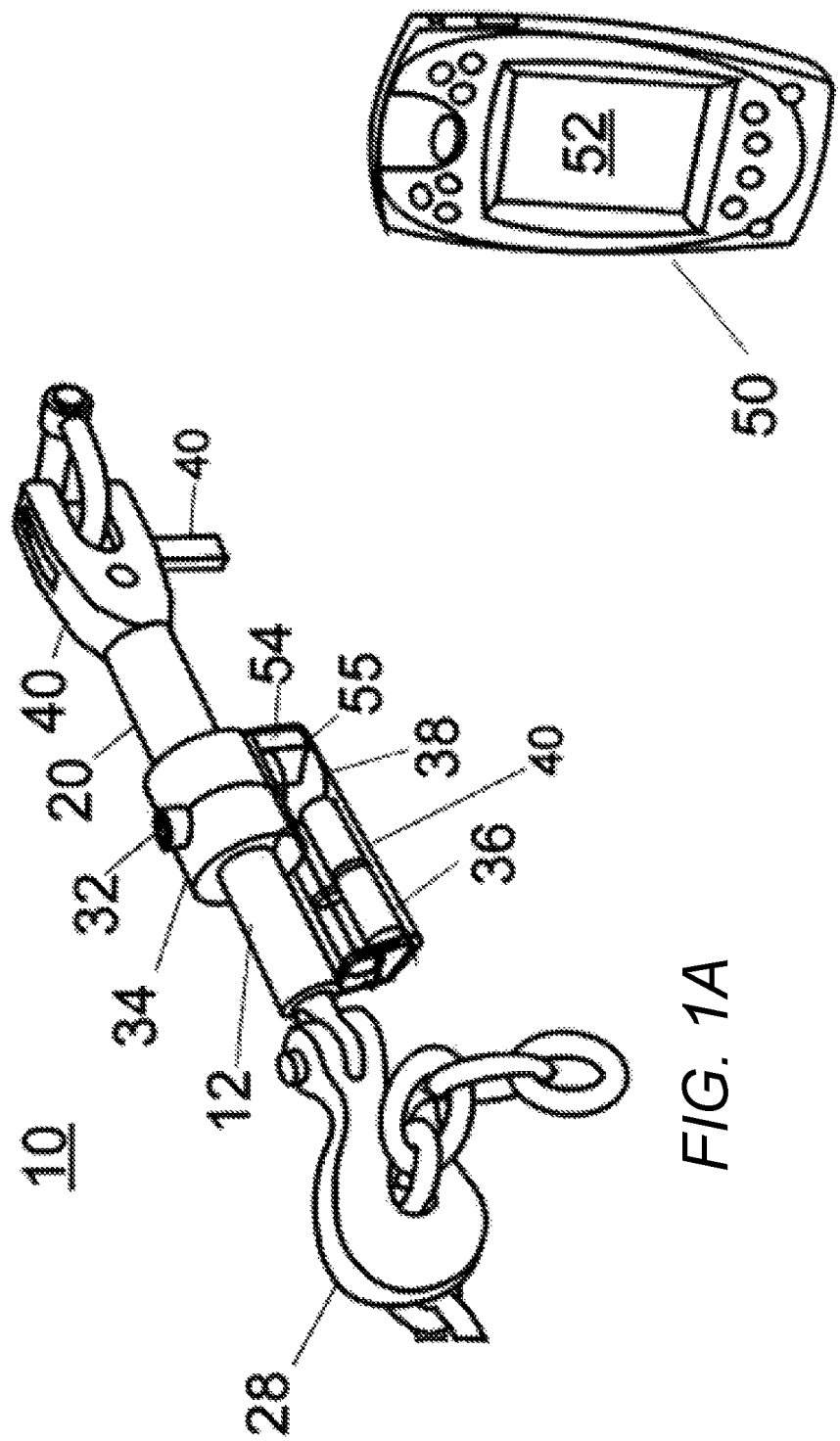
FIG. 1A is a perspective view of an embodiment of a cargo restraint system.
FIG. 1B is a perspective view of a remote controller for a cargo resistant system.
Figure 2:
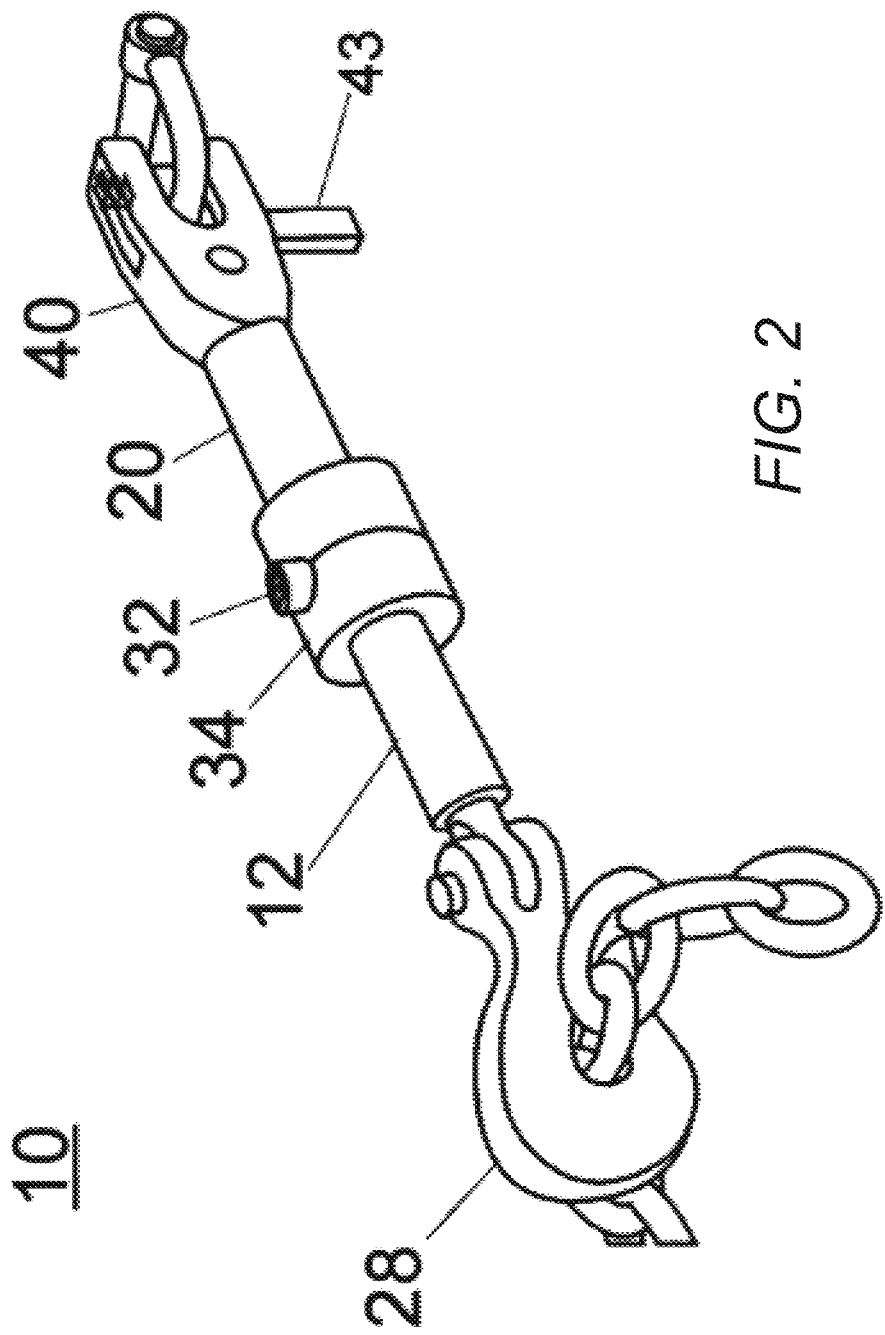
FIG. 2 is an isometric drawing of a powered restraint system in the embodiment of FIG. 1.
Figure 3:
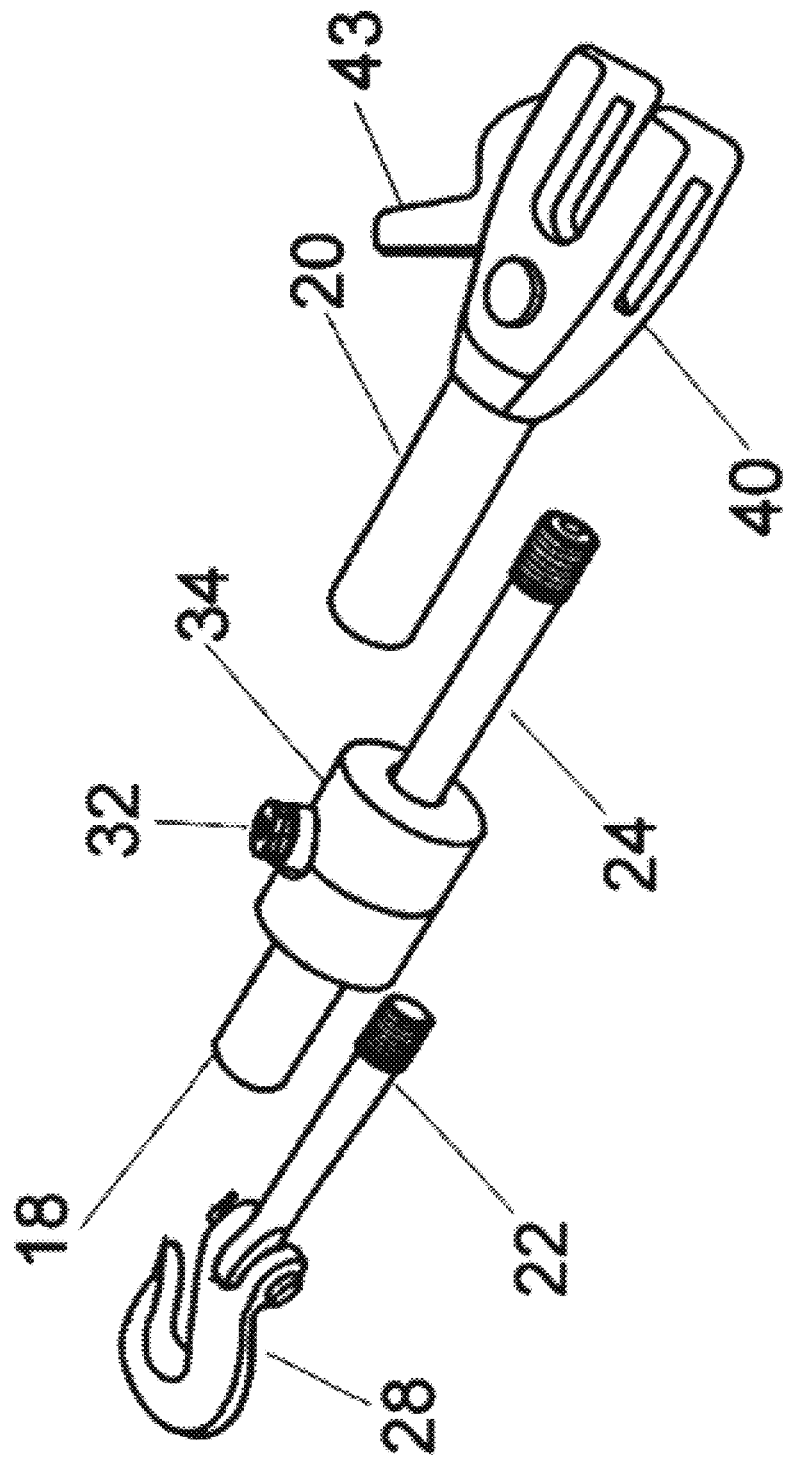
FIG. 3 is an exploded view of the powered restraint system of FIG. 2.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Figure 4:
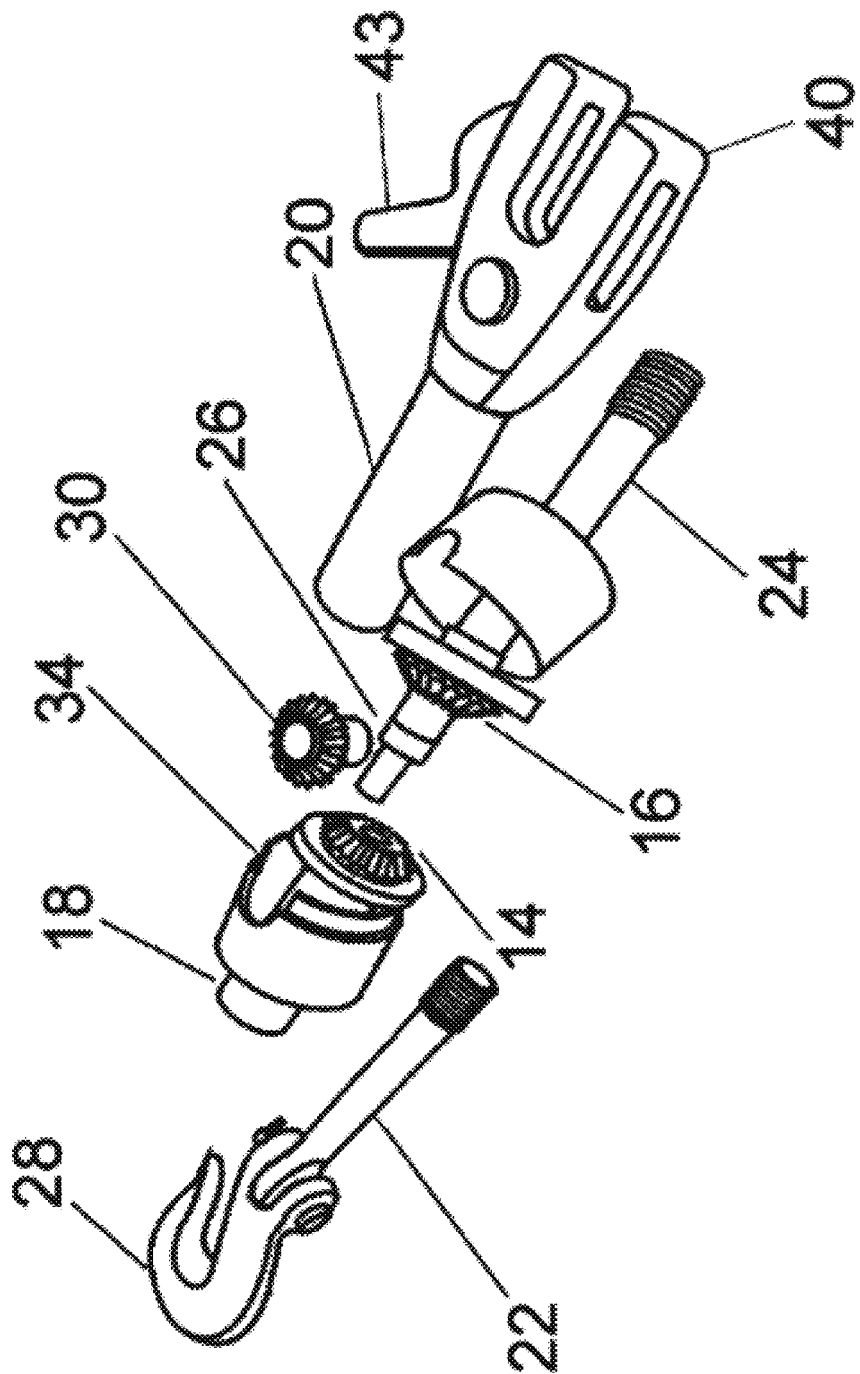
FIG. 4 is a view of the powered restraint system of FIG. 2 shown in disassembled condition.
Figure 5:
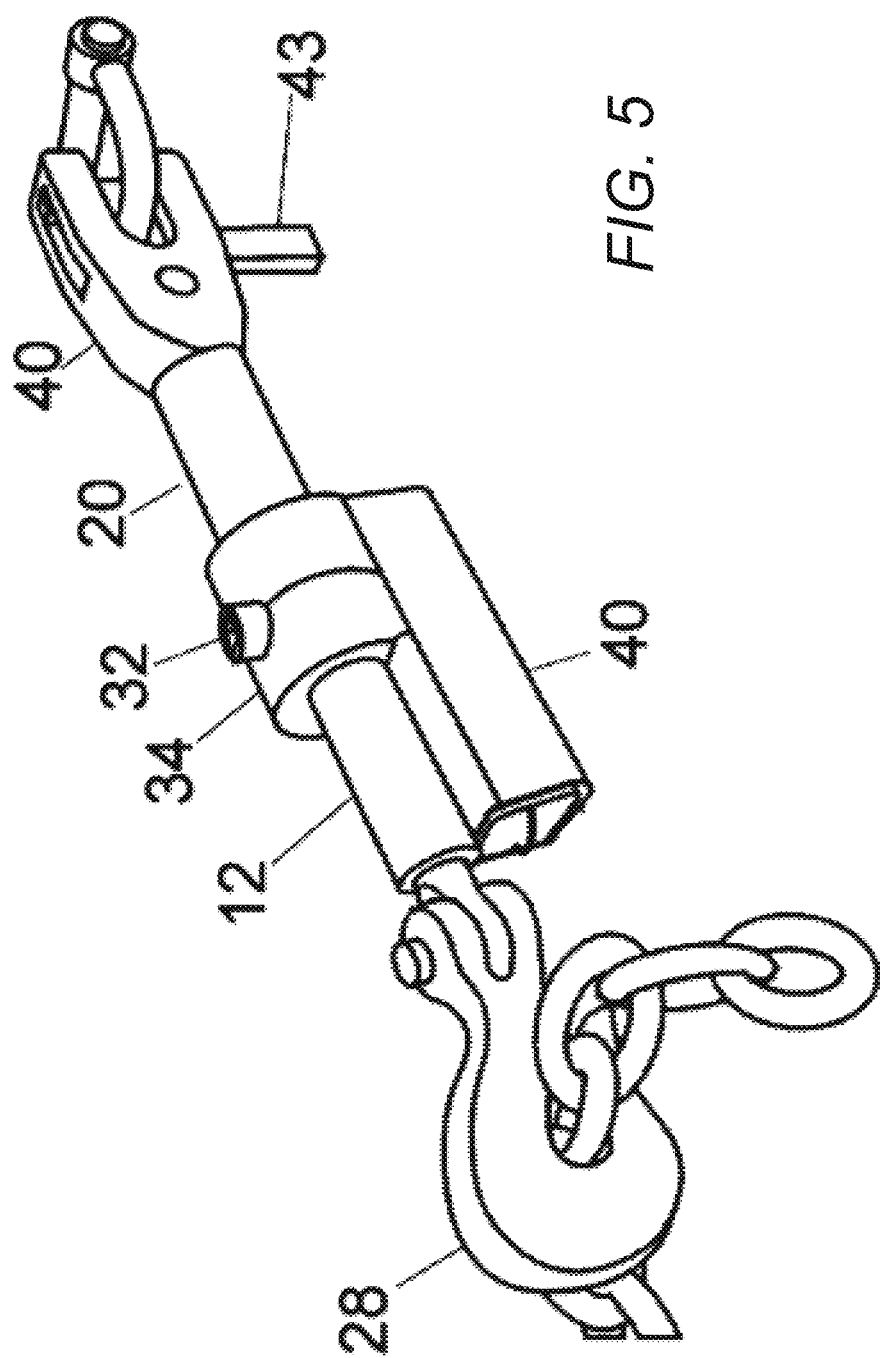
FIG. 5 is an isometric drawing of the assembly of FIG. 2 with a power unit added thereto.

Referring to FIGS. 1-8, there is shown a first embodiment of a cargo restraint system 10. As shown in FIG. 1, system 10 includes a powered restraint system 12 that is used to create a self-tightening and self-releasing restraint system. In accordance with one aspect of the invention, the cargo restraint system uses an arrangement of high strength bevel gears as shown in FIG. 4. In particular, system 10 employs a hook receiver bevel drive gear 14, coupled to an internally threaded hook receiver 18, and a claw screw bevel drive gear 16 which is coupled to exterior threaded claw receiver 24. Hook receiver bevel drive gear 14 and claw screw bevel drive gear 16 each revolve around a forged central axle 26. Threaded hook receiver 18 may be coupled with hook 28 via complementary threading on hook shaft 22. Threaded claw receiver 24 may be coupled to claw 40 via complementary internal threading in the hollow claw shaft 20. The receivers (18, 24), attached to the bevel gears, are driven by driver bevel gear 30, which is attached to the central axle. When the drive bevel gear 30 is rotated, the bevel gears (14, 16) on the receiver tubes rotate in the same direction. If the driver bevel gear 30 is rotated counterclockwise, both receiver bevel gears (14, 16) rotate clockwise, which cause receivers (18, 24) to also rotate clockwise, being directly coupled to the receiver bevel gears. Rotation of hook receiver 18 in a clockwise direction causes hook shaft 22 to be drawn into receiver tube 18, toward the central drive mechanism. Similarly, rotation of claw receiver 24 in a clockwise direction causes claw shaft 20 to be drawn over claw receiver 24, toward the central drive mechanism. When a securing member (e.g., a chain, cable, rope, etc.) is coupled to hook 28 and claw 40, the securing member is tightened around the cargo when the receivers are drawn toward the central section of the system. If the driver bevel 30 is rotated clockwise, the securing member is loosened. It is estimated that an electric motor or impact wrench, coupled to driver bevel gear 30, with a peak torque of 250 ft-lbs would easily spin the drive gears even under severe loads.

In some embodiments, the restraint system components include: a hook shaft 22, a hook receiver 18, a hook receiver bevel drive gear 14, a drive bevel gear 30, a manual drive receptacle 32 (see FIG. 3), an central axis pin 26, a claw screw bevel drive gear 16, a main housing 34, a battery 36

(see FIG. 8A), a motor 38 (see FIG. 8A) and electronic housing 40 (see FIG. 8A), a claw screw 24 (see FIG. 4), and a claw receiver 20 (see FIG. 4). The components are preferably of forged steel construction and sealed to the environment. The assembly 10 is insensitive to extreme heat or cold. A quick manual override of the motor powered system is provided by means of manual drive receptacle 32.

In one embodiment, a quick release claw 40 is designed to hold a securing member when engaged, and to lock in such a way that load shifting will not cause the securing member to be released while tightening. Claw 40 will also be configured to release the securing member, either by manual opening of the claw, or when instructed by a remote controller, as will be hereinafter described in further detail. In an embodiment, securing member may be released through direct intervention by manual application of force on release tab 43.

Figure 6:
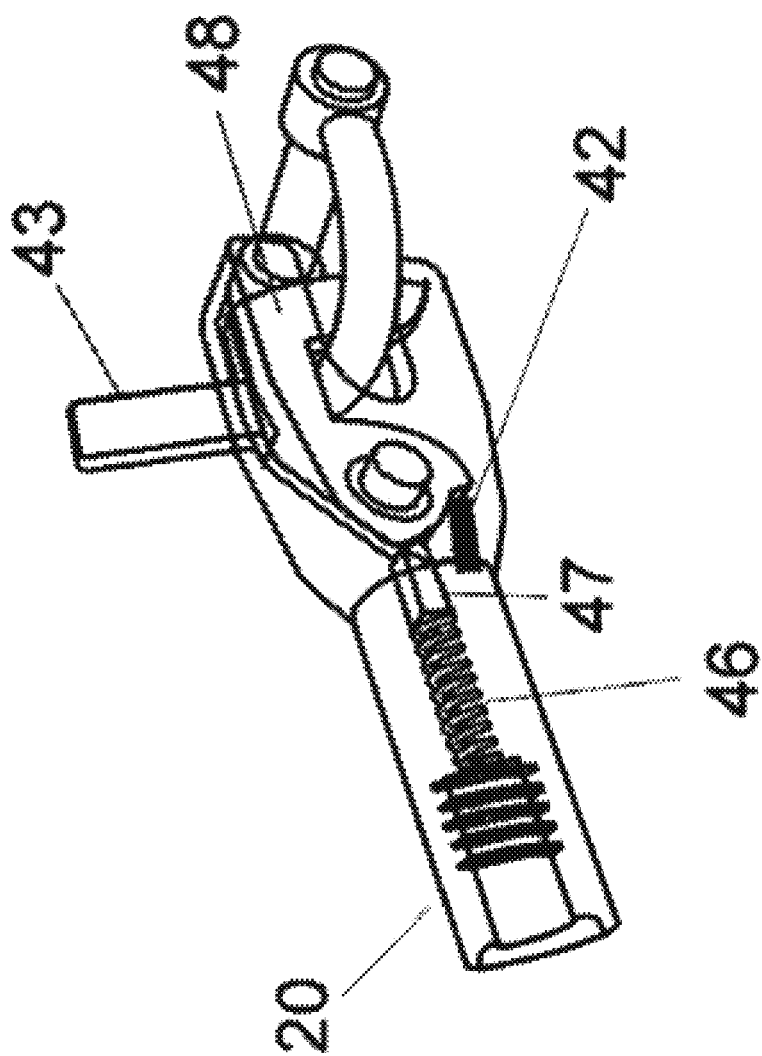
FIG. 6 is a partially cut-away perspective view of a quick release hook assembly.
Figure 7:
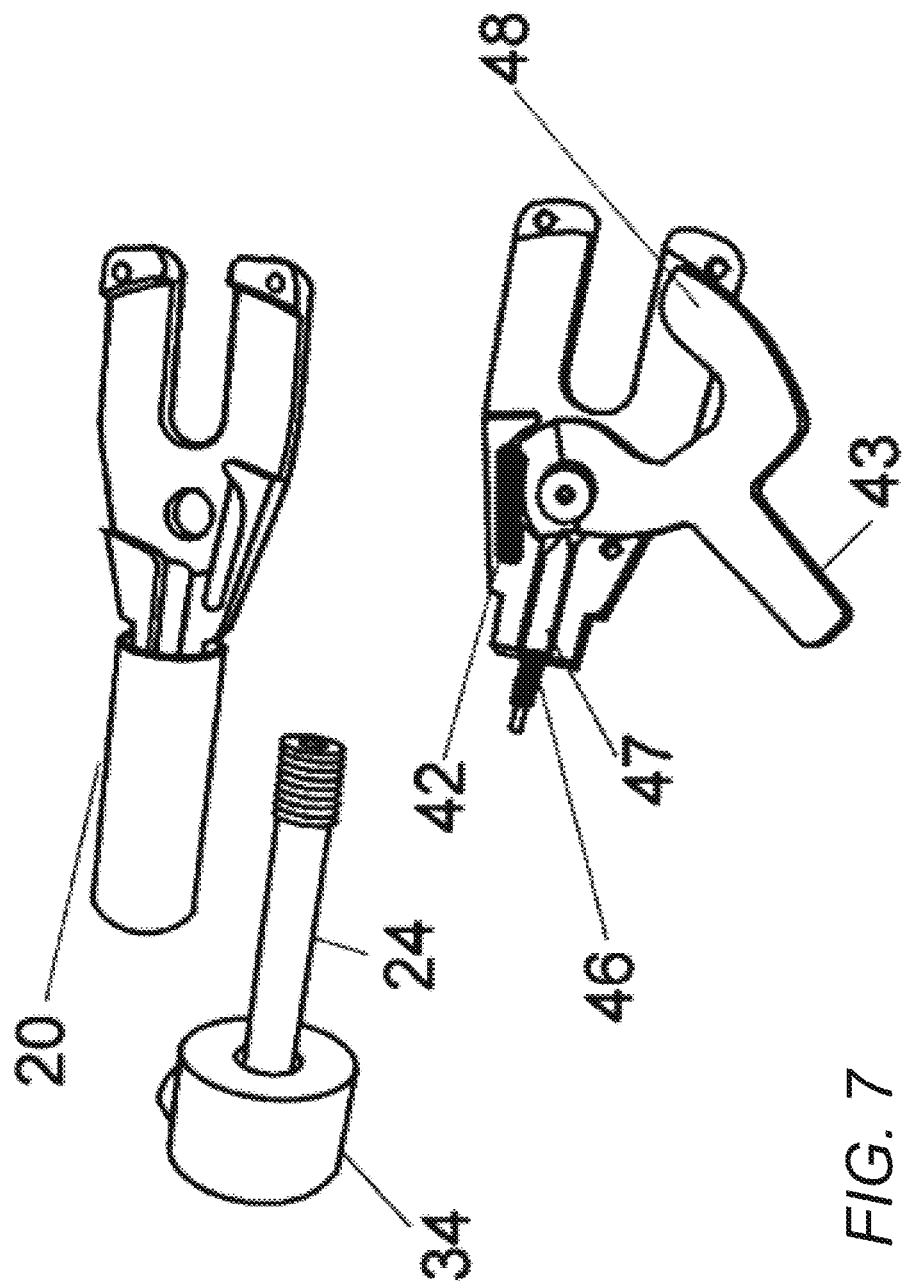
FIG. 7 is a view of the quick release hook assembly with its components disassembled.

With reference especially to FIGS. 6 and 7, the quick release hook components include a claw shaft 20, a claw actuator spring 42 (see FIG. 6), a detent 47, a spring assembly 46, and a claw 48. The components are of forged steel construction and, preferably sealed to the environment.

In one embodiment, the cargo restraint system includes an internal controller 54 which monitors and interprets signals coming from load sensors, motor and battery, internal to the restraint system 10, as well as control signals from remote control 50, as will be described hereinafter in further detail (FIG. 8B). Internal controller 54 within housing 40 sends data from the restraint system 10 to the remote control 50, including, but not limited to, such information as battery strength, the load on the restraint system, a unique identification of the restraint system, and whether the restraint system has been released and dropped to the ground. Furthermore, internal controller 54 can receive data from remote control 50 and act on it in order to perform certain functions, including, but not limited to, order the load to be released, order the tension on the load to be increased or loosened in transit, and, after release, order restraint system 10 to extend to a fully released position.

Remote control 50, shown in FIG. 1B, allows the user to interact, remotely, with the restraint system 10. In one embodiment, remote control 50 is a hand-held transceiver with a keypad, barcode scanner, and LCD display. In one embodiment, controller 50 monitors and stores information coming from multiple individual restraint systems. Such information may include, without limitation, a unique identifier (ID) of one or more of the tensioning stations; the condition of one or more of the tensioning stations; remaining battery life in one or more of the tensioning stations; the current load on one or more of the tensioning stations; and error conditions exhibited by one or more of the tensioning stations. Controller 50 preferably includes a mapping and display capability so that a graphical representation of the location of one or more of the tensioning stations can be provided, and information regarding the status of each mapped tensioning station associated with the graphical representation. The controller 50 is capable of sending a release signal to one or more of the tensioning stations, and can obtain the ID of each tensioning station when it is installed so that it can be identified and located. Controller 50 further preferably communicates with a computer system, so that the information regarding the tensioning stations may be stored and communicated to various relevant parties.

Restraint system 10 also includes one or more sensors 55 (see FIG. 1) that measure and monitor the operating parameters of the system. Sensors that may be incorporated into the restraint system include a sensor for detecting the tension on the securing member. Additional sensors may be used to determine if the securing member is properly engaged with the hook or the claw, and if the restraint system has been disengaged from the securing member. Accordingly, sensors 55 may be configured to determine when grip is dropped to the floor and fully disengaged. In addition, for the fastest redeployment, the grip should be in its fully extended mode when the crew is trying to attach the grip to the vehicle. In this way, the grip has the greatest amount of take-up distance when attached to the securing member. A sensor may be used to tell the system when the components of the restraint system are fully extended. Finally, an underway tension adjustment methodology is incorporated in the internal controller and/or the remote controller. A control algorithm is used by either controller to balance the need to keep the cargo secure with the control problem of tension "seeking" (i.e. detensioning and over tensioning), battery life, allowable tensioning limits, and so on.

In embodiments which include a motor drive for the turnbuckle, a power source 36 for the motor drive is preferably one selected to strike a balance between power, power density, safety, longevity, cost, and other factors. Lithium batteries show distinctive advantages in weight over other types of batteries. In one embodiment, a quick charge Aerogel Capacitor is used to power the motor drive. In a preferred embodiment, each restraint system includes a battery that will allow the restraint system to be used at least fifty times without recharging. Battery should provide sufficient power to the motor to allow the restraint system to secure the cargo within 45 seconds and unwind within 30 seconds on arrival of the cargo at its final destination. This provides an overall time savings in the loading/unloading part of the transportation of cargo of 50% to 70%. Advantageously, disembarking time is only limited by the time it takes to move the cargo off of the carrier.

For embodiments which incorporate a motor drive 38 for the turnbuckle, the motor may be a Quadrant System radially wound, electronically commutated, brushless motor (ECBM). The Quadrant is a variety of ECBM that uses a powdered metal stator to reduce eddy losses, and has a theoretical one pound to one horsepower output. In one embodiment, motor drive 38 can be made in a wide variety of aspect ratios (diameter to height) without significant changes in efficiency. The motor power is in the 400- to 500-watt range, and the motor weighs on the order of 14 ounces, and is estimated to have 350 in/lbs. of torque. In a specific embodiment, the motor is approximately 400 watts at 18 volts, with a diameter of 70 mm and a height of 40 mm. The motor drive preferably uses a powdered metal stator and rotor and state-of-the-art magnetic material for a potential of a 1 hp, 1 pound. As a delivered "system" it will weigh approximately 18 lbs for a 15% savings.

In some embodiments, restraint system is a fully automated grip that will self-tighten once attached, maintain its tension while underway, and remotely unlash and drop away from the cargo with no human interventions at the disembarking location. In a fully-featured implementation, the restraint system is designed to monitor its own operational status and let users know when operational intervention is required, such as recharging, maintenance, or relocation.

In accordance with another important aspect of the invention, in a given implementation a system having fewer than all of the optional functional elements described herein can be provided. At the lowest end, the restraint system itself, with an off-the-shelf drill-driver to power it, might be deployed without inclusion of a motor, sensor, or electronics of any type. Such a simple implementation of the invention still offers significant benefits and improvements in lashing/unlashing times as compared with prior art systems.

In another implementation a simple battery-powered tension sensor may be included.

Figure 9:
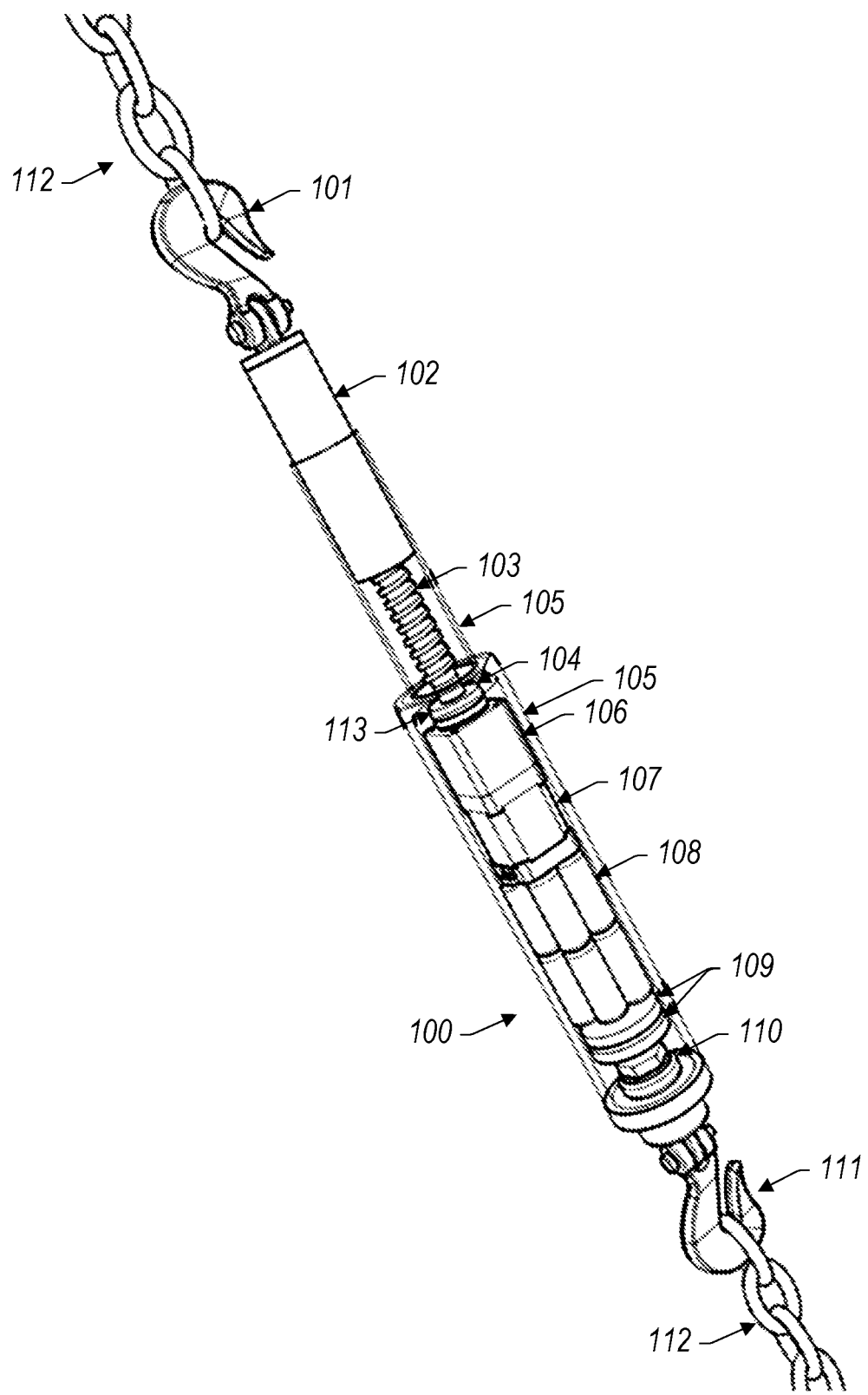
FIG. 9 is a perspective view of an alternate embodiment of a cargo restraint system.

An alternate embodiment of a cargo restraint system 100 is shown in FIG. 9. Restraint system 100 includes a motor 107, a gear reduction drive 106, a battery pack 108, controller/communication boards 109, and a load cell 110. A screw thread 103 is rotated by motor 107, through the gear reduction drive 106 and a thrust load bearing 104. Screw thread 103 is complementary with internally threaded load tube 102 which is connected to a hook 101. Hook 101 may be fastened to a securing member (e.g., chain 112). A second hook 111 is coupled directly to housing 105. Thus, in contrast to the previous embodiment, second hook 111 is not pulled or pushed from the housing, but instead remains at a fixed position to the housing. While the use of hooks are depicted in this embodiment, it should be understood that any kind of connector may be used to couple the restraint system with the securing member, including hooks and claws described earlier). In an embodiment, second hook 111 may not be present and the end where the hook was attached may be fastened directly to the cargo being secured or to the trailer/vehicle carrying the load. Load cell 110 includes one or more sensors that determine the tension on the restraint system when the system is engaged with cargo. An alternate embodiment may use a tension and/or compression measuring device that is integrated into the body 105. An alternate embodiment may use a microprocessor and transceiver for the controller/communication boards.

Motor 107, whether AC or DC, generates the force necessary to pull hook 101 inward into the housing body 105 to tighten the load. Motor is reversible and can reverse the direction to move the hook away from the housing body. This allows chain 112 to loosen, allowing the chain to be disengaged from hook 101 and released from the cargo. Motor 107 drives though a gear reduction device 106 to multiply the force of the motor to deliver sufficient tension to the chain or securing strap to hold the cargo. Gear reduction device 106 may be any combination of planetary gears, spur gears or a harmonic drive capable of multiplying the rotational torque from the motor to tighten and hold the load as required. Operation of motor 107 and gear reduction drive 106 drives the screw thread 103 which multiplies the force of the pull and thus tightens the chain 112, increasing the tension on the chain.

The screw thread device 103, fixed to gear reduction drive 106, applies the force through the housing body 105 though a thrust bearing 104 sandwiched between the screw thread flange 113 which is fixed to the distal end of screw thread device 103 and the housing body 105. Thus, housing body 105 is the load carrying member that conducts the tensioning force through the chains 112 to the hooks (101, 111) through the internally threaded load tube 102 though the screw thread device 103 which is loaded onto the screw thread flange 113 onto and through the thrust bearing 104 which then loads the housing body 105.

Motor 107 is powered by batteries 108. In some embodiment, motor 107 may be powered by an external power source. Batteries 108 could be charged from an external source though a charger hookup external to the unit or the charger circuit could be added to the microprocessor controller board 109.

Figure 10:
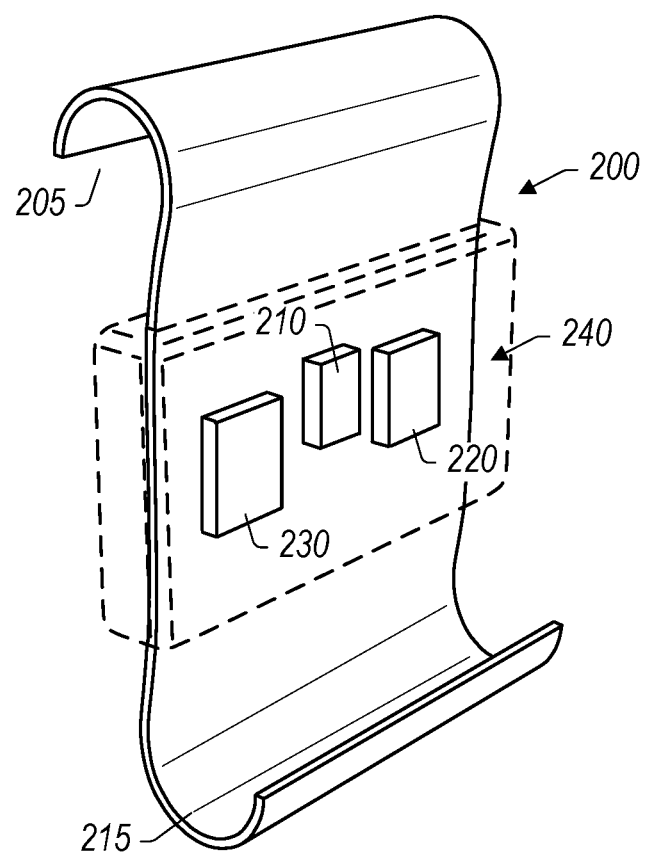
FIG. 10 is a perspective view of a cargo restraint clip.

An alternate embodiment of a cargo restraint system is depicted in FIG. 10. Cargo restraint system 200 acts as a clip that couples the ends of a securing member, but does not provide a device for tensioning the securing member. Restraint system 200 includes a first connecting end 205 and a second connecting end 215 on opposing sides of the restraint system. While connecting ends are depicted as curved ends, a connecting end can be in any configuration that allows it to be coupled to a securing member being used to secure cargo. For example, connecting ends may be in the form of hooks or claws (including hooks and claws described earlier) and may be in a quick release configuration.

Restraint system 200 includes a load sensor 210 which measurers the tension between first connecting end 205 and second connecting end 215. Load sensor 210 is coupled to microprocessor/transmitter 220. Microprocessor/transmitter 220 collects tension information from load sensor 210, stores and/or processes the tension information, and transmits the information to a remote controller or remote computer. In an alternate embodiment, the microprocessor/transmitter 220 could be a microprocessor/transceiver wherein commands and/or parameters are sent to the device. A display (not depicted) may be attached to the housing 240 of the electrical components. The display may be coupled to microprocessor/transmitter and display a tension measurement collected by the load sensor. A battery 230 may be disposed in housing 240 to provide power to the microprocessor/transmitter and the load sensor. In an embodiment, battery 240 is a rechargeable battery.

Figure 11:
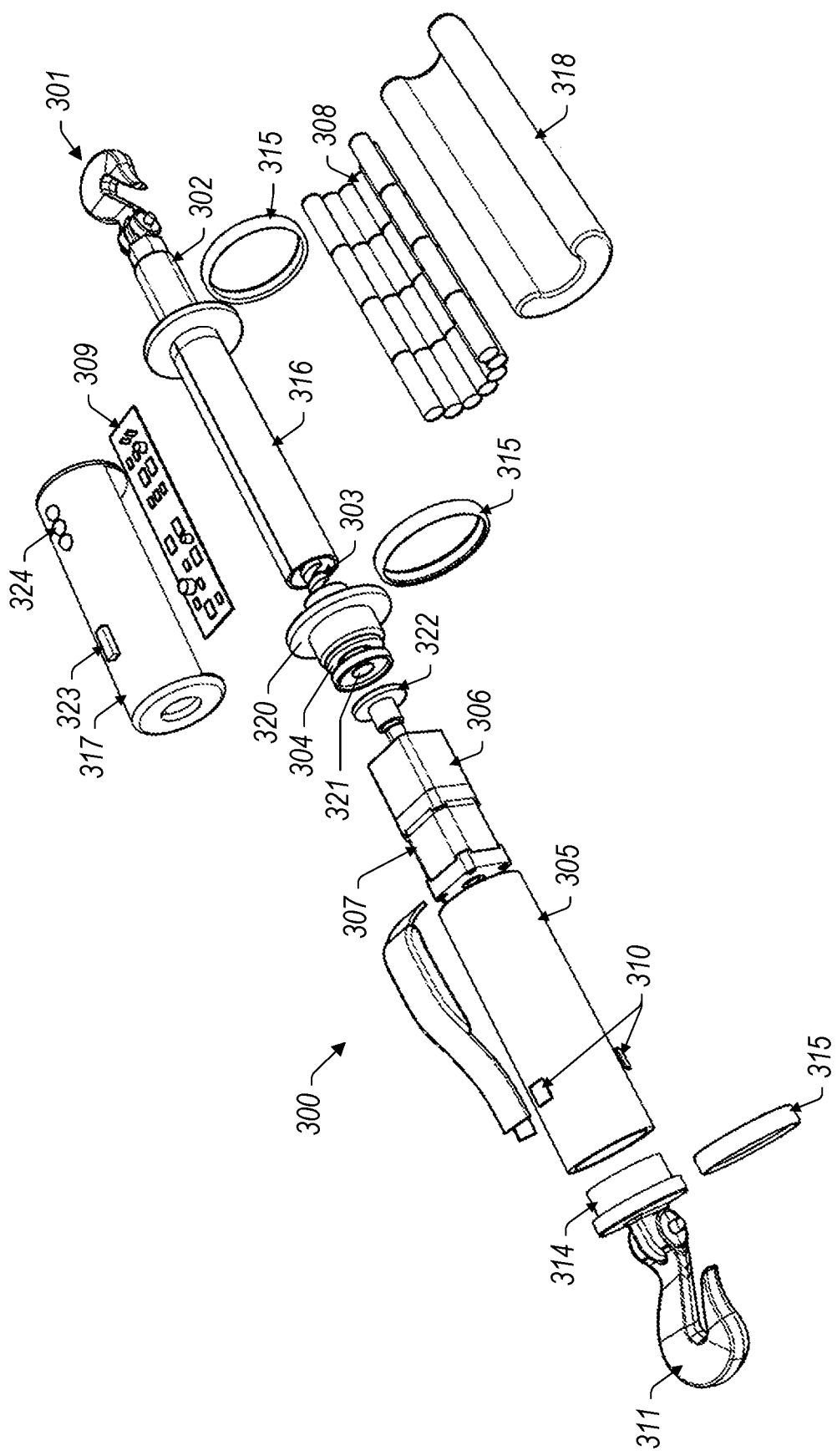
FIG. 11 is an exploded view of a cargo restraint system.

Another embodiment of a cargo restraint system 300 is shown in FIG. 11. Restraint system 300 includes a motor 307, a drive 306, a battery pack 308, controller/communication boards 309, and load sensors 310. In one embodiment, drive 306 may be a harmonic drive, in another embodiment, drive 306 may be another gear reduction mechanism such as a planetary gear. A drive screw 303 is rotated by motor 307, through the drive 306 and a thrust load bearing 304. Drive screw 303 is coupled to main load carrying connector 320 via complementary thrust carrier connectors 321 and 322. Drive screw 303 threading is complementary with internally threaded load tube 302 which is connected to upper hook 301. Hook 301 may be fastened to a securing member (not shown). A bottom hook 311 is coupled to the main case 305 via a bottom load carrier 314. Elastomer rings 315 are used between the various components to create a dirt and moisture resistant barrier and to reduce vibration in the system. While the use of hooks are depicted in this embodiment, it should be understood that any kind of connector may be used to couple the restraint system with the securing member, including hooks and claws described earlier).

As discussed in previous embodiments, motor 307 generates the force necessary to pull hook 301 inward into the load carrier cover 316 to tighten the load. Motor is reversible and can reverse the direction to move the hook away from the housing body. Motor 307 is powered by batteries 308. Batteries 308 and microcontroller/transmitter electronics 309 are positioned in a cavity defined by upper case 317 and battery case 318. An operation button 323 is disposed on the upper case 317. During use, a user of the device can initiate tensioning or release of tension using the operation button. One or more indicators 324 are also coupled to the upper case. Indicators can be used to indicate the various operating states of the system.

The controller/communications assembly in each of the embodiments described herein includes a controller board which receives values corresponding to the amount of tension placed on the device, through tensioning on the chain, by communicating with the tension sensors (e.g., load cell 110). A microcontroller in controller/communications receives tension information from a tension sensor and processes the tension information to filter out the "noise." As used herein, the term "noise" refers to the changes in tension produced by movement of the securing member and/or the cargo. Noise filtering smoothes the tension data to allow the system to ignore slight changes in tension that result from these movements. After noise filtering of the tension data, the filtered tension information is used by the controller to determine if the securing member is undergoing a loosening or tightening which requires adjustment of the tension applied by the securing member to the cargo.

In one embodiment, noise filtering is done by measuring the initial tension on the restraint system when the cargo is secured. This sets a baseline tension measurement. Noise is then defined as a percentage of the baseline tension (e.g., 10%). Any tension values subsequently measured that are within ±10% of the baseline tension can be considered noise and the information discarded or ignored. If the tension changes by more than the predetermined percentage, then an alert is sent to check the cargo and adjust the position of the cargo or the tension on the securing member, as appropriate.

Noise can also be defined based on the time that the tension on the securing member is changed with respect to the baseline tension measurement. For example, if the tension is rapidly changing (i.e. changes values in less than one minute), it could be assumed that the change is due to slight movement of the cargo or movement of the transportation vehicle for the cargo. However if the tension changes and remains outside the baseline tension for a set time (e.g., one minute), an alert may be raised to indicate that the restraint system needs to be checked and the tension adjusted.

In an embodiment, noise levels are determined using a smart learning approach. Rather than just basing noise on a percentage of an initial measurement value, noise can be determined by constant monitoring of the tensions on the cargo, and using the tension data to determine how much variation in tension occurs during transport of the cargo. Applying statistical analysis and taking account the transportation conditions, a more sophisticated noise model is created. The noise model is used by the controller to determine when the tension of the securing members on the cargo is outside of an acceptable range. The use of a noise model can help prevent false positives.

In addition, the controller board/load cell combination is designed to help the user to know how much force is being applied to the load during the tie-down process. During the tie-down process the device reads the load cell through the microprocessor and then communicates that information through the communication board to the remote control. The data may be communicated via Wi-Fi, over the internet to a laptop, or smart phone or if the user's vehicle has a Wi-Fi connection, the vehicle, or via Bluetooth directly to the user's smart phone or the through a separate RF receiver which then may be sent over the Internet via Wi-Fi. Thus, the communication board can have multiple communication modalities: Wi-Fi, Blue Tooth, RF or even through Near Field Communication as required. Such communication capabilities allow others besides the adjacent user to oversee the tensioning process and then to monitor load throughout transit, through the Internet via Wi-Fi, smart phone, direct satellite link, RF or other wide range technology.

In another embodiment, preset loads are programmed into the microprocessor to insure a minimum load is attained or to insure that an overtensioning event does not happen upon loading or during transit. In the case of a loosening event while underway, the device can be programmed to attempt to automatically re-tension up to the load limit as well as alerting the user of the event. The load information is determined, to some extent, by the mass of the cargo. Based on the mass of the cargo, and the initial tension, the controller may set a deviation value (e.g., 10%) which represents the tension that will trigger an alert or change by the system.

The system can be programmed or commanded to release the load by unwinding at the destination, thus speeding up the unloading process. Proper security algorithms can be utilized to keep the load from being released inappropriately by the user or by hackers.

The system may be capable of transmitting locational information. In an embodiment, a GPS may be included to determine and report the location of the cargo restraint system. This could assist the user with tracking the location of cargo being transported, or to ensure the cargo restraint system is not left behind during use (i.e. loading, unloading, etc.). The unique identifier of each cargo restraint system may also be used to quickly determine the number of available and active devices on the truck to quickly assess if adequate devices are available for transporting cargo, or to ensure that none of the devices are left behind at a location. A Local Positioning System (LPS) algorithm may be used to determine the relative position of the cargo restraint system with respect to the smart controller (located on the truck) to ensure that cargo restraint systems are not lost or stolen.

Cargo restraint system may be engaged or disengaged via a remote controller or smart phone app. A switch on the cargo restraint system may be disabled via the remote controller, or smart phone app, for security purposes with the benefit of being notified of changes in tension when the load is parked/not moving.

The controller allows controlling, monitoring and adjusting multiple cargo restraint restraint systems. For example, when securing a load, a multiple of CRTS tension to a preset force, equalizing among the CRTS.

In an embodiment, transport data is captured and analyzed to automate load tensioning. Transport data may include capture: tension level over time, geographic position and type of cargo. Transport data may be stored in a database. The captured transport data may be provided as an input to the auto-tensioning and monitoring of loads.

The internal controller may include learning capabilities which assist in determining the preset tension limits. For example, capture data on equipment type and configuration (e.g. Case 580C front end loader, etc.), analyze algorithmically, and place into a database for future reference to configure cargo restraint systems and automatically tension equipment during loading.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A cargo restraint system comprising:
    a body;
    a first connecting end and a second connecting end on opposing sides of the body, wherein the first and second connecting ends are coupled to a securing member which is used to restrain the cargo;
    one or more load sensors coupled to the first connecting end and/or the second connecting end;
    a controller coupled to the one or more load sensors, the controller configured to receive tension information from the one or more load sensors, wherein the controller comprises a transmitter capable of transmitting the tension information to a remote device; and
    wherein the controller is further configured to filter out noise associated with the tension information, wherein the noise is associated with changes in tension produced by movement of the chain and/or the cargo.

2. The cargo restraint system of claim 1, wherein the filtered tension information is used by the controller to determine if the securing member is undergoing a loosening or tightening which requires adjustment of the tension applied by the securing member to the cargo.

3. The cargo restraint system of claim 1, wherein the noise is defined as a percentage of a baseline tension, and wherein the controller is configured to send an alert to the remote device to indicate that the tension of the securing member on the cargo should be adjusted if the measured tension exceeds the noise.

4. The cargo restraint system of claim 1, wherein the controller is capable of transmitting tension information to the remote device using multiple communication modalities.

5. The cargo restraint system of claim 1, wherein the controller comprises preset tension limits, wherein the controller provides an alert when the tension measured by the one or more load sensors is greater than or less than preset tension limit.

6. The cargo restraint system of claim 5, wherein the tension limits are received dynamically.

7. The cargo restraint system of claim 1, further comprising a restraint system disposed in the body, wherein the restraint system is configured to increase or decrease the tension on the securing member.

8. The cargo restraint system of claim 7, wherein the amount and timing of increases and/or decreases in the tension on the securing member is learned over a period of time.

9. The cargo restraint system of claim 7, wherein the restraint system is configured to increase or decrease the tension on the securing member in response to an alert produced by the controller when the tension on the securing member is above or below a predetermined tension.

10. The cargo restraint system of claim 7, wherein the controller comprises preset tension limits programmed into the controller, wherein the restraint system is configured to increase or decrease the tension on the securing member in response to an alert produced by the controller when the tension on the securing member is above or below the preset tension limits.

11. The cargo restraint system of claim 1, wherein the controller provides an alert when the tension drops below a predetermined level that indicates that the cargo is no longer secured by the securing member.

12. The cargo restraint system of claim 1, wherein the batteries are configured as a removable battery pack.

13. The cargo restraint system of claim 12, wherein one or more removable battery packs can be recharged on the vehicle.

14. The cargo restraint system of claim 1, wherein selected parameter(s) and/or measured tension is/are transmitted to a remote location on a specified interval.

15. The cargo restraint system of claim 14, wherein the transmitter is capable of transmitting the tension information over WiFi to an Internet site.

16. The cargo restraint system of claim 14, wherein the transmitter is capable of transmitting the tension information over WiFi to a private WiFi recipient.

17. The cargo restraint system of claim 14, wherein the transmitter is capable of transmitting the tension information over a cellular network.

18. The cargo restraint system of claim 14, wherein the transmitter is capable of transmitting the tension information over a satellite network.

19. The cargo restraint system of claim 1, wherein multiple devices can act in a coordinated manner to secure a cargo load.

20. The cargo restraint system of claim 19, wherein the multiple devices that coordinate share a means of coordinating that excludes non-coordinating devices.

21. The cargo restraint system of claim 1, wherein the tension information is transmitted to a personal device.

22. The cargo restraint system of claim 21, wherein commands and settings are transmitted from the personal device to the controller.

23. A method of restraining cargo comprising:
    passing a securing member around at least a portion of the cargo;
    coupling the ends of the securing member to a cargo restraint system, the cargo restraint system comprising:
        a body;
        a first connecting end and a second connecting end on opposing sides of the body, wherein the first and second connecting ends are coupled to a securing member which is used to restrain the cargo;
        one or more load sensors coupled to the first connecting end and/or the second connecting end;
        a controller coupled to the one or more load sensors, the controller configured to receive tension information from the one or more load sensors, wherein the controller comprises a transmitter capable of transmitting the tension information to a remote device;
    increasing the tension on the securing member to secure the cargo;
    monitoring the tension on the securing member using the one or more load sensors wherein, during monitoring, the controller filters out noise associated with the tension information, wherein the noise is associated with changes in tension produced by movement of the chain and/or the cargo; and
    transmitting the tension information to a remote device.

* * * * *